Oct. 25, 1966
G. E. BULLOCK
3,281,069
CREDIT BALANCE TRANSFER MECHANISM FOR TEN-KEY
ADDING AND SUBTRACTING MACHINE
Filed Feb. 3, 1964
6 Sheets-Sheet 1
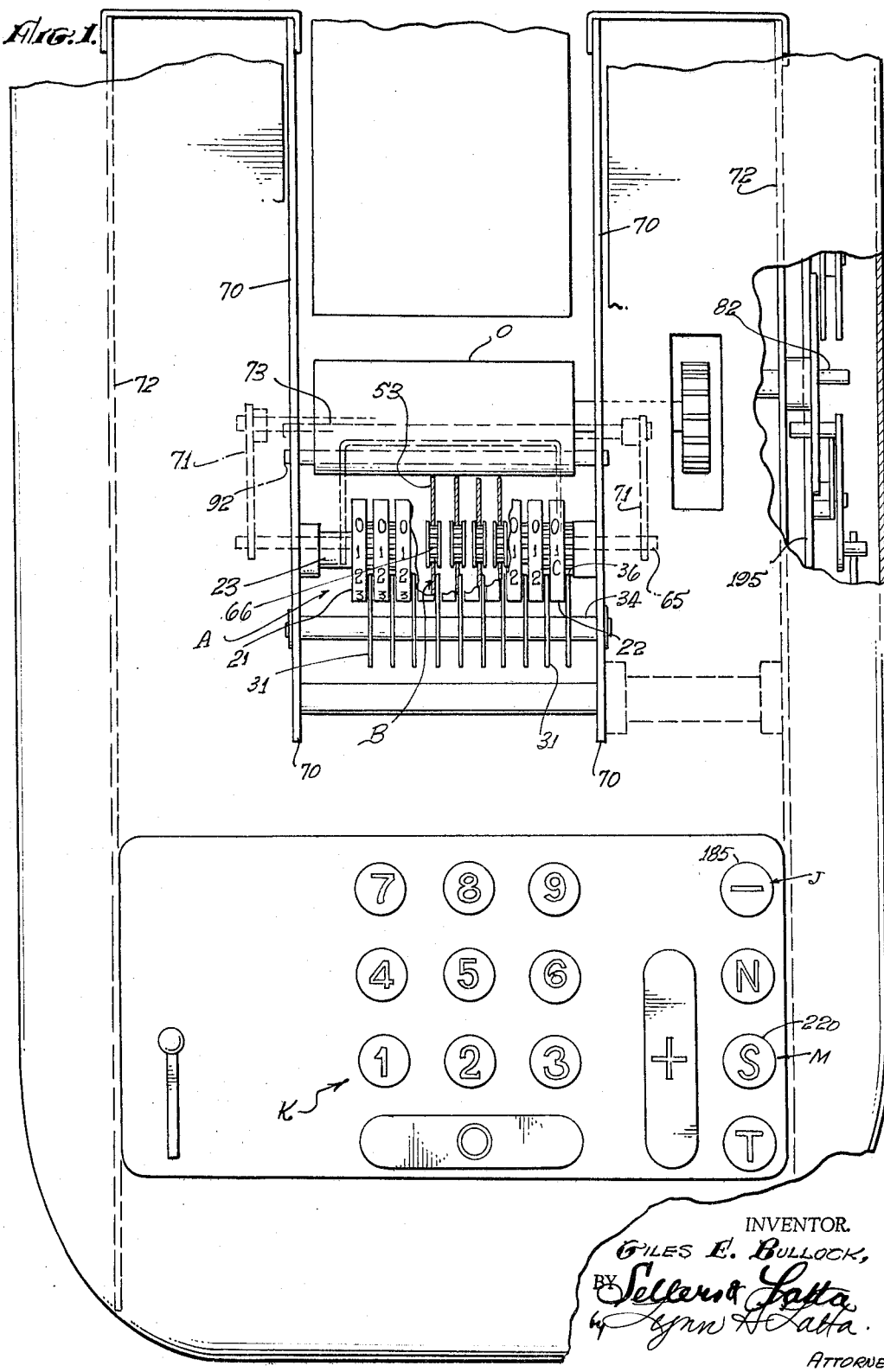

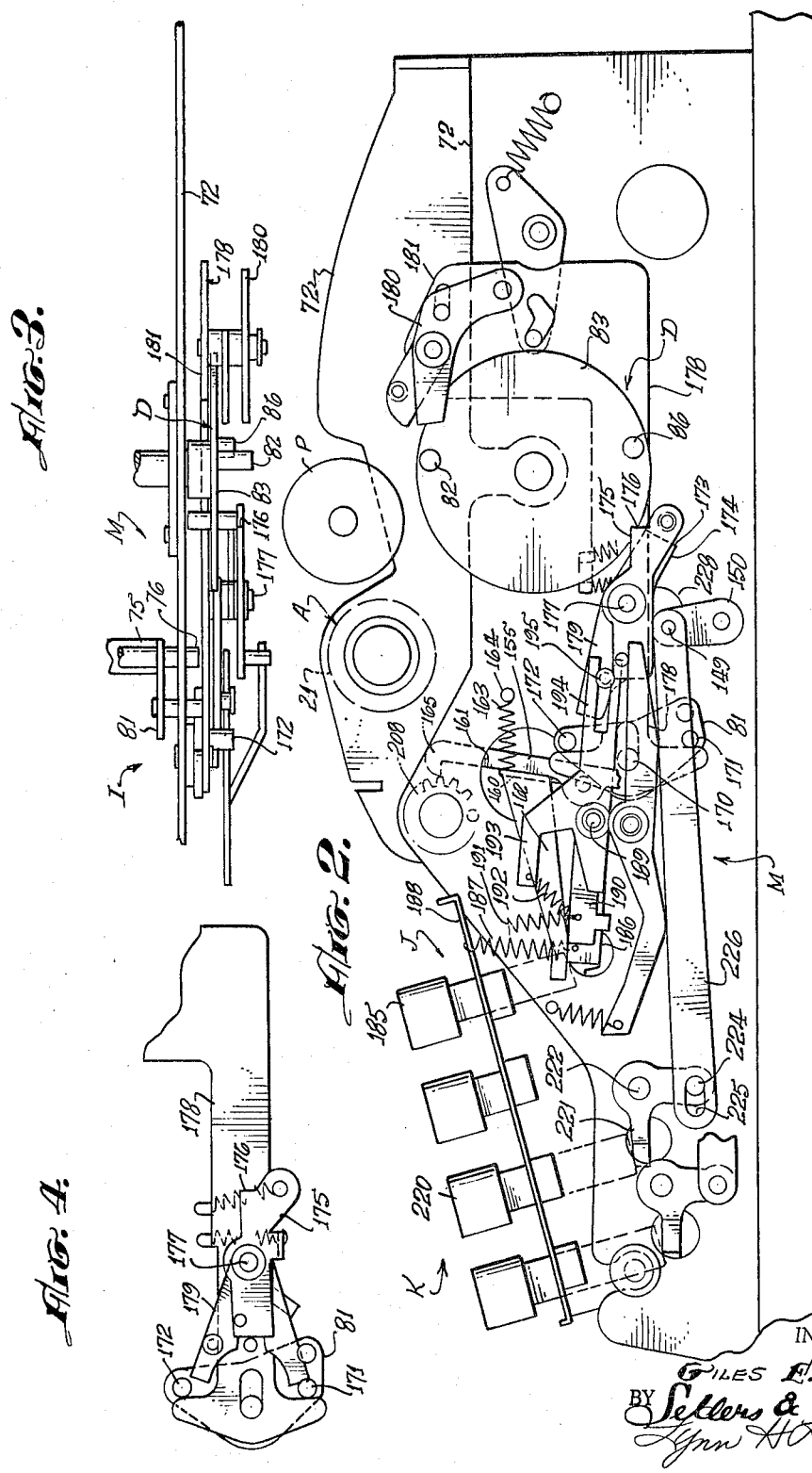

Oct. 25, 1966

G. E. BULLOCK 3,281,069

CREDIT BALANCE TRANSFER MECHANISM FOR TEN-KEY
ADDING AND SUBTRACTING MACHINE

Filed Feb. 3, 1964

INVENTOR.
GILES E. BULLOCK,
BY Sellers & Latta
Lynn H. Latta
ATTORNEYS

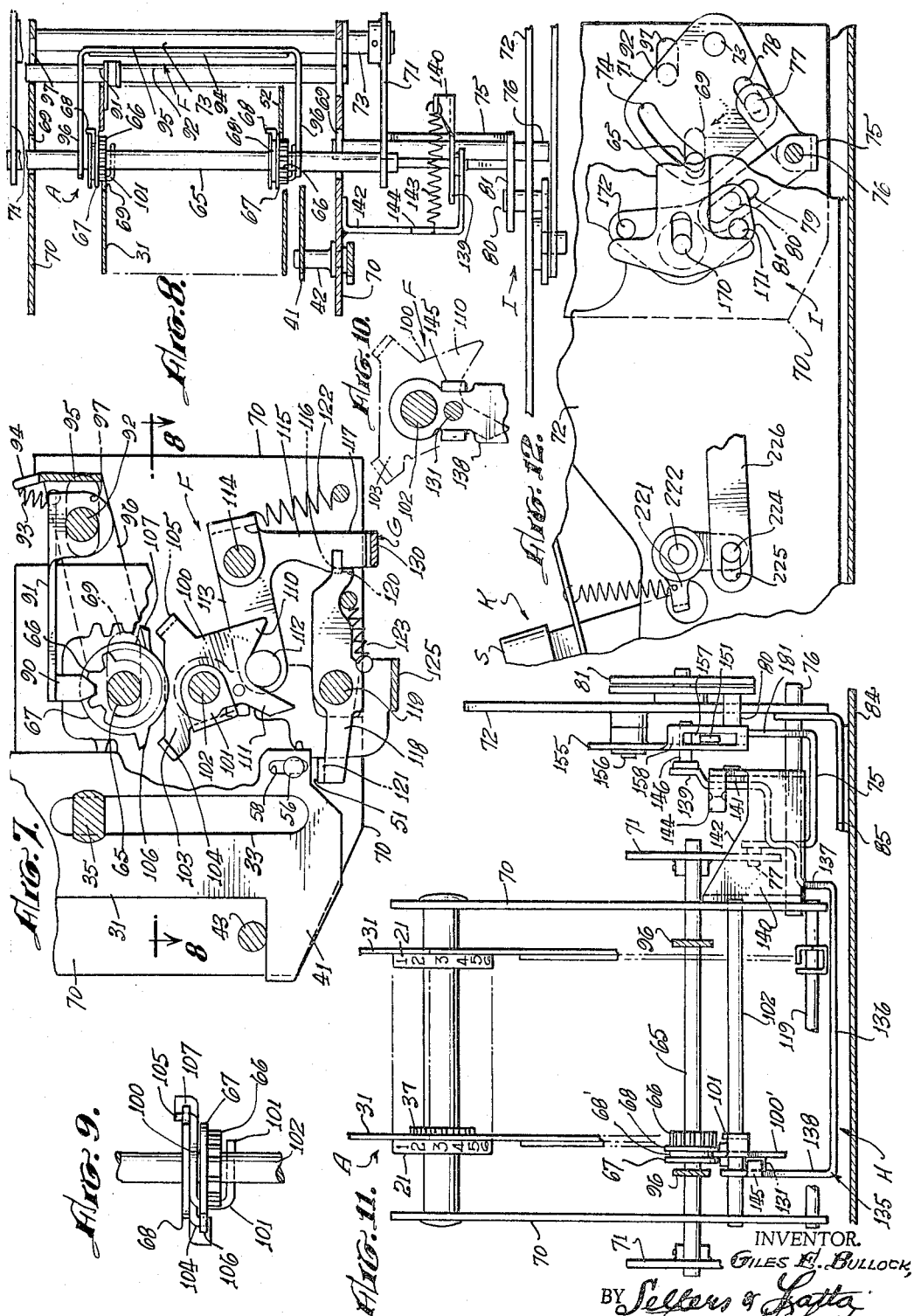

GILES E. BULLOCK,
INVENTOR.

BY Salters & Latta
BY Lynn H. Latta

ATTORNEYS

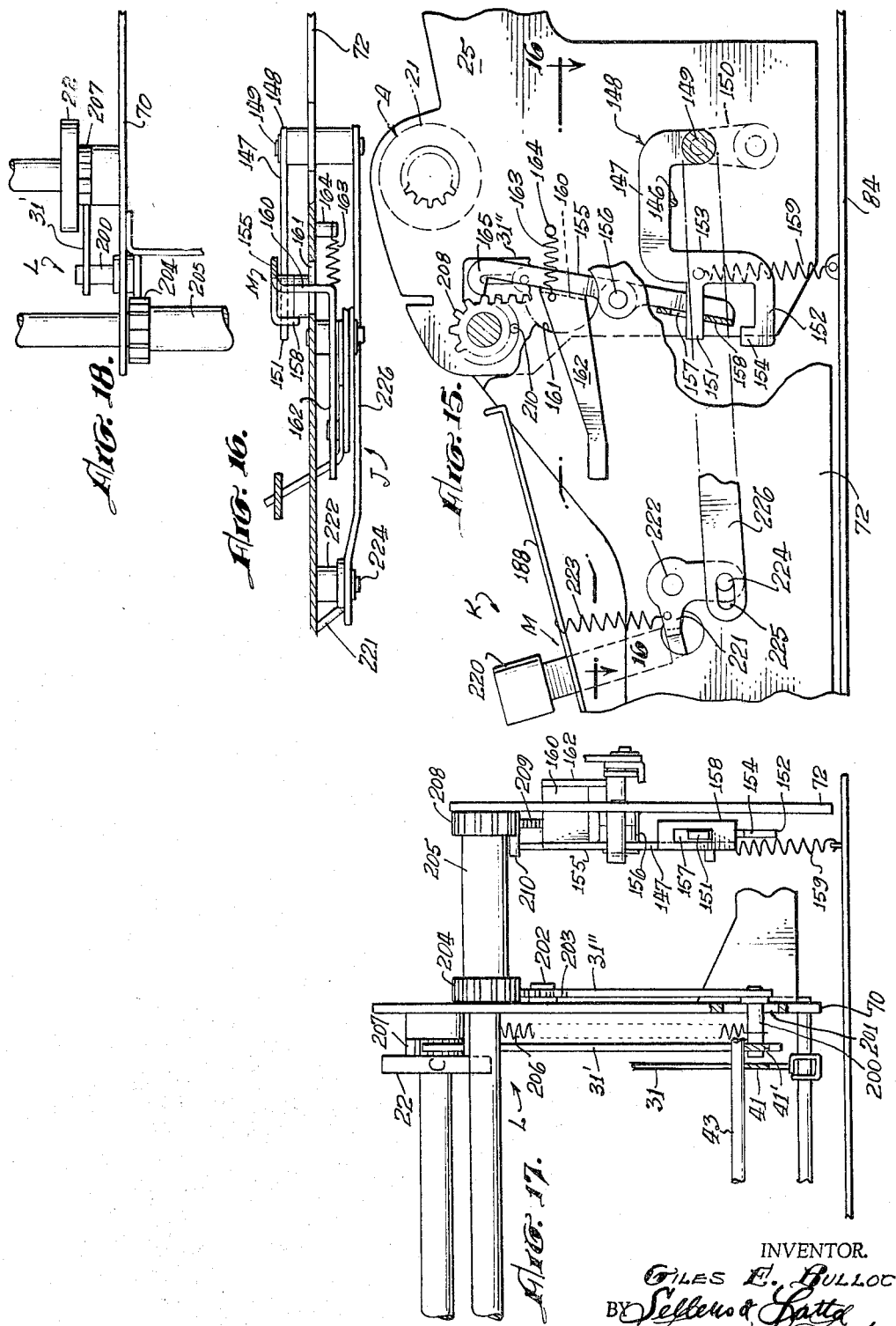

United States Patent Office 3,281,069
Patented Oct. 25, 1966

3,281,069
CREDIT BALANCE TRANSFER MECHANISM FOR TEN-KEY ADDING AND SUBTRACTING MACHINE

Giles E. Bullock, Reseda, Calif., assignor to Imperial Business Machines, Los Angeles, Calif., a corporation of California
Filed Feb. 3, 1964, Ser. No. 342,096
2 Claims. (Cl. 235—60)

This invention relates to computing machines of the type disclosed in my patent application Serial No. 223,112, now U.S. Pat. No. 3,194,496, filed September 12, 1962 for Pin Carriage to Clutch Interlock Mechanism in a Ten-Key Adding and Subtracting Machine.

The general object of this invention is to provide an automatic credit transfer mechanism in an exceedingly small, compact, light weight computer.

More in detail, my invention relates to a transfer mechanism which becomes automatically operative whenever, in adding and subtracting concurrently, the accumulated total falls below zero value, said transfer mechanism then automatically causing (when called upon for sub-total printing) the sub-total value to register in positive numbers followed by a "C" to indicate a credit balance (in contrast to the normal printing in complements of the true figures). Conversely, whenever, in adding and subtracting concurrently, the accumulated total again passes the zero value on the "up" side, and said transfer mechanism automatically causes, (when called upon for sub-total printing) the sub-total value to register in positive numerals, in debit rather than credit form.

A "complement" as referred to herein may be defined and understood to be that value which results from deducting any number from a set of zeros corresponding to the number of digit columns in the deducted number, preceded by the numeral "1."

It is noteworthy to state that all answers shall be mechanically correct so long as the rated capacity of the machine is never exceeded in a single computing cycle, it being consistent with the mechanics of this invention, that when the rated capacity of the machine is exceeded, the automatic transfer mechanism will register an extra digit, altering a proper accumulated total in the like amount. Caution is therefore exercised to avoid ever exceeding the machine's capacity in any single computing cycle, the need for exceeding said capacity being unlikely, since the rated capacity usually is 99 million dollars, or 9 billion in engineering terms of mathematical computation.

It should be noted that, since the values in the accumulator memory device can never be discerned by the operator without actual printing, a principal object of the present invention is to render "automatically operative" the said credit transfer mechanism, the instant of transition, with or without the knowledge of the operator.

Most adding machines now incorporate, not only the adding function, but the subtracting function as well. This is true with the machine in this invention. In this machine the adding and subtracting operations are both performed, in each column, by a common actuator device embodying a rack which guides a pinion on a printing wheel, the movement of which is limited by the engagement of dual opposing racks on each actuator, alternately engageable with shiftable pinions whose positions determine the accumulated digit value in each of the decimal positions of the machine.

Other objects and advantages will become apparent in the ensuing specification and appended drawings in which:

FIG. 1 is a partial plan view of an adding machine embodying my invention, disclosing those units of the machine which are regarded as necessary to illustrate the invention;

FIG. 2 is a right side elevation view of the same; with cover removed;

FIG. 3 is a fragmentary plan view of the linkage on the rightward side of the machine, seen in elevation in FIG. 2;

FIG. 4 is a rightward elevational view of obscured portions of the linkage seen in FIG. 2;

FIG. 7 is a fragmentary vertical sectional view showing, on an enlarged scale, the portion of the mechanism seen in FIG. 5;

FIG. 8 is a horizontal sectional view at approximately the level indicated by the line 8—8 of FIG. 7;

FIG. 9 is a detail plan view of one of the accumulator gear units;

FIG. 10 is a detail vertical sectional view of parts associated with a flipper unit;

FIG. 11 is a skeletal vertical sectional view looking rearwardly in viewing selected portions of the dial wheel assembly and credit transfer linkage;

FIG. 12 is a fragmentary side elevational view of the mechanism of FIG. 2, showing parts that are obscured in that figure;

FIG. 15 is a fragmentary elevational view showing portions of the credit transfer mechanism some parts of which are forwardly of the outward frame wall and other parts of which are behind the outer frame wall which is broken away at the rightward side of the figure to disclose such other parts;

FIG. 16 is a horizontal sectional view of the same taken on the line 16—16 of FIG. 15;

FIG. 17 is a fragmentary front elevational view showing the credit symbol-marking linkage at the rightward forward corner of the machine; and FIG. 18 is a fragmentary plan view of the mechanism of FIG. 17.

GENERAL DESCRIPTION

Figure 5:
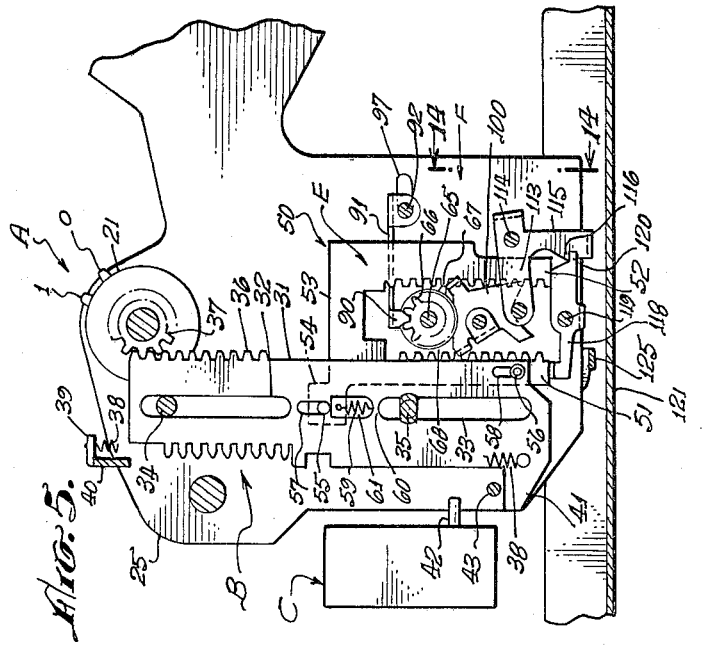
FIG. 5 is a fragmentary longitudinal sectional view illustrating the actuator rack, pin carriage, accumulator gear and column transfer units of the machine in their relationship to one another, viewed from the rightward side of one of these groups of units.

In general, my improved credit transfer mechanism is embodied in a light-weight ten-key adding and subtracting machine embodying an assembly of dial wheels A (FIG. 1) for printing on tape when indexed by actuator rack units B (FIG. 5), in response to operations on a keyboard K, key-punching being operative on a pin carriage C to project stop pins for arresting elevation of racks B at heights corresponding to the keys that are punched. The imprinting operation is effected by power actuation of cam mechanism D (FIG. 2) under control of an add or subtract key, in a series of power cycles. The racks B, during downward return to home positions in the power cycles, actuate respective gears of accumulator gear mechanism E to accumulate the values of all numbers theretofore registered in the series of power cycles following the last totaling operation. In the accumulating operations, transfer of accumulated values from column to column is effected by column transfer mechanism F (FIG. 7).

In sub-totaling and totaling operations, the totals of the values accumulated on the accumulator gears are printed in response to actuation of power cam mechanism D controlled by actuation of a sub-total or total key, these operations involving the actuation of the accumulator gears and dial wheels by the racks B on their up-strokes, the resultant rotation of the gears being arrested at positions corresponding to their respective accumulated digit values, thereby determining the printing positions of the dial wheels.

The present invention provides a back transfer connection G (FIGS. 7, 14) between the accumulator unit of highest value and the accumulator unit of lowest value to correct for a "lost digit" resulting from movement of the high value unit past its limit position. Connection G also sets up the operating connection to an indexing mechanism which intervenes in the operation of a power cycle to reverse the direction of operation of the accumulator mechanism upon the depression of a sub-total key. This opertion is carried out by a credit balance rocker assembly H (FIG. 11).

The credit transfer mechanism is interlinked with and exerts an over-control upon the add and subtract control linkage I (FIGS. 3, 12); upon the minus key linkage J (FIGS. 2, 16); a symbol rack assembly L (FIGS. 17, 18) and sub-total mechanism M (FIGS. 2, 3, 16). The operation of the apparatus will be explained after these units have been described, in the order named above.

DETAILED DESCRIPTION

*The dial wheel assembly A.*— (FIG. 1) comprises a plurality of dial wheels 21 (the number of wheels determining the capacity of the machine) each having on its periphery a plurality of printing type for imprinting the digits 1, 2, 3 etc. (so designated in FIG. 1) in the digit series 0–9 inclusive, these dial wheels, together with a symbol wheel 22, being mounted for free rotation upon an axle 23 which is supported between inner side members 70 of the machine frame. The dial wheels 21, beginning with the rightward extremity of the group, represent the unit, 10, 100, etc. columns of the arabic number system (or the two decimal columns and then the unit, 10, etc. columns of the decimal system) in the conventional arabic number system.

*Actuator Rack Units B.*—(FIG. 5) each comprise a vertically slidable plunger 31 having aligned guide slots 32, 33 traversed by transverse guide rods 34, 35 (common to the full set of actuator units) and each having along its rear margin at its upper end, rack teeth 36 meshing with a pinion 37 secured to a respective dial wheel 21. It will immediately be apparent that the degree of rotational displacement of a dial wheel 21 from a home position will depend upon the position of elevation of a respective rack plunger 31. In the home position, the zero type, shown and so designated in FIG. 5 is in printing position, and the other type, in the sequence 1, 2, 3, etc., are disposed in consecutive counter-clockwise spacing from the zero type as seen when viewed in the direction in which FIG. 5 is viewed. The home position of rack plunger 31 is a lower limit position, seen in FIG. 5, and from this position the plunger moves upwardly to rotate its respective dial wheel 21 (clockwise in FIG. 6), thus successively bringing the digits 1, 2, 3 etc., in turn, to the printing position.

Figure 6:
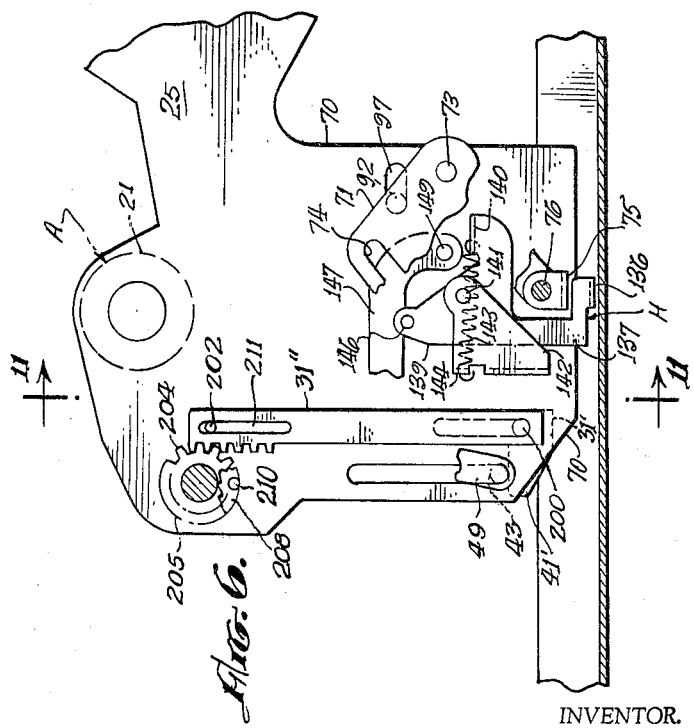
FIG. 6 is a longitudinal vertical sectional view showing, in elevation, portions of the mechanism just inwardly of the rightward frame wall.

Each rack unit B further includes a coil spring 38, connected under tension between the lower end of a respective plunger 31 and an anchor finger 39 carried by a support bar 40 bridging between and carried by the side frame members 24, 25. The spring 38 biases its respective plunger 31 for upward dial-rotating movement, to a value-registering position determined by engagement of a projecting foot 41 on the plunger 31 against a selectively actuated stop pin 42 of pin carriage unit C. A more extended description of unit C is given in my co-pending application S.N. 233,112, referred to above. All of the actuator plungers 31 are returned downwardly to their home positions at the end of a power cycle by a power operated return mechanism including a transverse bar 43 which is actuated from cam assembly D as described more in detail in my aforesaid copending application S.N. 223,112, by linkage 49 (FIG. 6).

Each rack unit B further includes a yielding dual rack member 50 of n-form, comprising respective add and subtract rack arms 51 and 52 depending from a connecting web 53 which has a tail 54 projecting laterally beyond rack 51. Yielding rack member 50 is attached to plunger 31 for relative vertical sliding movement by means of rivets 55, 56 secured in tail 54 and in the lower end of rack 51 respectively and slidably engaged in slots 57, 58 in the plunger 31. A coil spring 59 is connected under tension between tail 54 and a narrow web 60 of plunger 31 and is received in a window 61 in plunger 31. Spring 59 constantly biases yielding rack member 50 to a lower limit position.

The yielding connection between plunger 31 and yielding rack member 50 provides for the transfer of an accumulated ten digits from one column to the next higher value column, as will be explained hereinafter.

*Pin Carriage C.*—Embodies a series of vertical columns of numeral-registering pins 42 slidably mounted for projection parallel to the longitudinal axis of the machine in response to actuation by mechanism controlled by the punching of numeral keys on the keyboard, the carriage being progressively shifted transversely under a spring bias by progressive release of escapement mechanism actuated by the key punching. Each time a numeral consisting of any number of digits up to the total number of columns in the machine is punched on the keyboard, a corresponding number of pins are projected, their vertical positions determining the stop position for each of the rack units B when released for spring-biased upward movement, these stop positions in turn corresponding to the digits of the number that has been punched on the keyboard, and the dial wheels A being correspondingly positioned to print the number that was punched. Reference is made to my co-pending application above identified for further details of this section of the apparatus.

*Accumulator Gear Mechanism E.*—(FIGS. 5, 7–9) comprises a series of accumulator gear assemblies, one for each of the rack plungers 31, mounted on a common shaft 65, each of these assemblies comprising a gear 66 disposed in the plane of a respective rack member 50, in the space between opposed teeth of rack arms 51, 52 for selective engagement therewith; and each assembly further including a pair of transfer gear cams 67 and 68, each secured to the hub of a respective gear and disposed just rearwardly of the plane of the respective rack 50 as viewed in FIG. 6. The cams 67 and 68 are separated axially by an intervening spacer 68' (FIG. 11) to provide an annular groove receiving a marginal portion of a flipper lever (hereinafter described) which is selectively actuated by one or the other of these cams for tripping a transfer mechanism to carry over an added (or subtracted) digit from one digit position to the next in the number being punched on the keyboard. The forward cam 67 actuates this flipper to the add position and the rearward cam 68 actuates the flipper to the minus position.

The common gear shaft 65 is mounted for horizontal shifting movement (for shifting the gears 66 between the rack arms 51, 52) by having its respective ends mounted in slots 69 (FIGS. 7 and 12) in side frame members 70; shifting movement being effected by a pair of box cams 71 disposed between inward side members 70 and outward side frame members 72, each cam having one end secured on a common rock shaft 73 and each cam having, in a swinging end portion thereof, a respective cam slot 74 in which is engaged a respective end of the gear shaft 65. It may now be noted that vertical swinging movement of the box cams 71 will be operative to shift the gear shaft 65 selectively to the left (to shift gears 66 from the neutral position shown in FIG. 5) into engagement with racks 51 for adding operation; or rightwardly to engage gears 66 with rack 52 for a subtracting operation.

Referring further to FIG. 12, the box cams 71 are actuated by transmitting movement through one of the cams to their common rock shaft 73, this being accomplished by a bell crank lever 75, pivotally mounted on a short shaft 76 mounted between adjacent frame members 70 and 72 on one side of the machine, having one arm provided with a crank pin 77 engaged in a slot 78 in the cam 71, having another arm 181 provided with an overtravel slot 79 in which is engaged a pin 80 carried by a rocker 81 which indirectly receives movement from a neutral-add-minus control stud 82 (FIG. 2) on a control cam 83 of cam mechanism D, which correlates the operation of the various units of the machine during each power cycle of the machine (in which a number punched on the keyboard is posted into the accumulator mechanism and is printed). Frame plates 72 are mounted to a bottom plate 84 (FIG. 11) by suitable bracket means 85. Cam 83 has an alternate control stud 86.

Each of the gear-cam assemblies 65–68 is provided with a respective detent 90 (FIG. 5) for locking it against rotation while in the neutral position and up to the point of engagement with the add rack 51 or the subtract rack 52 as the case may be.

Detent 90 is in the form of a tooth on the swinging end of a finger 91 pivoted on a shaft 92 mounted in the frame. Each detent is biased by a coil spring 93 (FIG. 7) connected under tension between the tail of finger 91 and a bracket 94 on the cross web of a mounting yoke 95 having, at respective sides of the gear assembly (FIG. 8) respective arms 96 the ends of which are carried on the shaft 65 so as to cause the yoke 95 to ride with the gear assembly as the latter is shifted to a selected position. The ends of shaft 92 are slidably mounted in slots 97 in frame member 70, thus supporting and guiding the yoke 95 in its movement in unison with gears 66.

Detent teeth 90 are pointed, as shown, so as to have a yielding action in holding their respective gears 66, which can be overcome by torque applied by the teeth of gears 66 when the latter are power-rotated, thus temporarily over-riding the holding action of the detents 90 until the gears have been rotated to the extent provided for by the setting of a respective unit of pin carriage C, the detent immediately returning to its holding position under the bias of its respective spring 93 as soon as the rotation of the respective gear is arrested.

*Column-Transfer and Accumulating Mechanism F.—*
Each pair of cams 67, 68 constitutes a portion of a respective column transfer and accumulator unit, one for each of the rack assemblies B. Each of these column transfer, accumulator assemblies comprises a flipper unit of stamped sheet metal comprising a flat body portion 100 (FIGS. 7, 9) having an approximately centrally disposed mounting yoke 101 formed from the leftward margin of its forward side as seen in FIG. 6, the yoke 101 and body 100 having registering apertures by means of which the flipper is mounted for swinging movement on a common pivot shaft 102 the ends of which are mounted in frame members 70. Each flipper further includes a head portion 103 having at one side thereof a forwardly projecting actuator and stop finger 104 and, at its other side, a rearwardly projecting actuator-stop finger 105. The upper margin of head portion 103 is substantially horizontal and its central area is received within the annular groove defined between the axially spaced cams 67, 68. Cam 67 has a projecting cam tooth 106 cooperable with actuator-stop finger 104, having a counter-clockwise-facing camming face as viewed in FIG. 7, engageable against finger 104 during counter-clockwise rotation of its gear 66 in an add power cycle when the accumulated value on gear 66 exceeds 9, to move finger 104 downwardly, rocking the flipper 100 for transferring one digit to the next higher decimal column; the tooth 106 having a clockwise-facing radial shoulder adapted to engage beneath finger 104 during clockwise rotation of its gear 66, to arrest the rotation of the respective gear-cam unit at a position which registers the accumulated value on this gear 66 during a sub-totaling or totaling cycle on the add side. The stopping of each gear-cam unit in such sub-totaling or totaling operation correspondingly arrests the upward movement of the respective rack plunger 31 and determines the position to which a respective printing dial 21 is indexed by the respective rack and pinion drive connection 36, 37; and in an ensuing printing the accumulated digit value in the respective columns is printed as a composite number representing a sub-total or total.

Cam 68 has a cam tooth 107 positioned to cooperate with the rearwardly projecting finger 105 of flipper 100, this cam tooth having a camming face facing clockwise, for camming action against finger 105 to tilt flipper 100 clockwise as viewed in FIG. 7 in a subtract power cycle; and having a radial stop shoulder facing counter-clockwise for engagement beneath finger 105 to arrest counter-clockwise rotation of a respective gear 66 in a sub-totaling or totaling operation on the subtract side, so as to register an accumulated negative value on the respective rack unit, this negative value being transmitted through rack and pinion drive 36, 37 to a respective printing dial 21 in the manner described immediately above (and in the same direction of rotation of the dial assembly). Cam tooth 107 becomes operative when the gear-cam assembly is shifted to the subtracting (rightward in FIG. 5) position in which gears 66 engaged rack teeth 52. The rocking of flipper 100 is utilized for transfer of accumulated values from column to column, through the following transfer mechanism.

At its lower end, each flipper 100 has downwardly diverging tail elements 110, 111, respectively. Embraced in the V-notch defined between tail elements 110, 111 is a follower pin 112 on the free end of a respective transfer pawl 113, one for each of the rack plungers 31. All transfer pawls 113 are mounted on a common fulcrum shaft 114 extending transversely through the assembly of pawls and having its ends mounted in frame members 70. Each pawl has a respective tail 115 projecting downwardly and having a latch tooth 116 near its lower end, and a bearing tip 117 projecting therebeyond. Each pawl 113 is associated with a respective latch lever 118 of a series of levers mounted on a common transverse fulcrum shaft 119, each lever 118 having at the end of one arm thereof, a rearwardly projecting transverse finger 120 engageable against bearing tip 117 and beneath latch tooth 116 of a respective latch tail 115; and each lever 118 having at the end of its opposite arm a laterally projecting stop 121 engageable beneath the lower end of a respective rack 51 of unit 50. Transfer pawl 113 is acted upon by a coil spring 122, in tension, to bias its pin 112 upwardly against flupper 100 to normally center it in a neutral position, and to bias its tail 115 against the adjacent arm of transfer latch 118. Each latch 118 is acted upon by a coil spring 123, in tension, biasing its stop 121 downwardly when its latch element 120 is released by retraction of transfer pawl 113.

When the transfer latch 118 is latched in the horizontal position seen in FIG. 7, the stop 121 will be held in a position to limit the downward movement of a respective yielding rack member 50 while permitting downward overtravel of the respective rack plunger 31 to the extent of one digit position, such overtravel being required for a carry-over or transfer operation. Such transfer operation becomes effective when a transfer latch 118 is released by retraction of its latching tail 115, thereby permitting the stop 121 to recede downwardly one digit position in the overtravel range of movement of a respective plunger 31, providing one digit of additional rotation of the respective gear 66 by a respective rack arm (e.g. rack 51 in an adding operation). As previously noted, the stop 121 projects into the path of downward movement of the rack assembly of the next column following the one corresponding to the rack-gear assembly which actuates the latch 118 to its release position, and thus it is the next rack assembly which is operative to accumulate an added digit of rotation of its respective gear 66.

At the end of each power cycle, when the accumulated values transmitted by gear 66 through rack units 50 have been registered on dial 21, those transfer latches 118 which have been released to their tilted positions, are restored to their horizontal positions and are relatched in those positions by the spring biased latching operation of the tails 115 of the transfer pawls. This is accomplished by a resetting bar 125 (FIG. 5) which is actuated by suitable linkage forming no part of the present invention and omitted from this disclosure to avoid undue complexity.

*The Credit Transfer Mechanism.*—of the present invention provides a back-transfer connection G (FIGS. 7, 13) between the accumulator unit of highest value and the accumulator unit of lowest value for releasing the transfer latch of the latter when the transfer pawl of the former is actuated by its flipper.

*Back Transer Connection G.*—comprises a bridge bar 130 rigidly connected (e.g. by a tail lever 115′) to a transfer pawl arm 113′ at the high value side of the accumulator assembly, bridging transversely past the series of transfer pawls 113, and rigidly connected to a latch tail 115″ at the low value side of the assembly. The transfer pawl arm 113′ has no latching tail 115 (tail lever 115′ functioning only as a lever arm) since there is no latch 118 beyond this position; whereas the latch tail 115″ is not embodied in a transfer pawl 113 since there is no flipper at this position to operate it. Instead, it is operated by the flipper 100′ at the high value side of the machine, acting upon the follower pin 112 (not shown) of the arm 113′.

Figure 13:
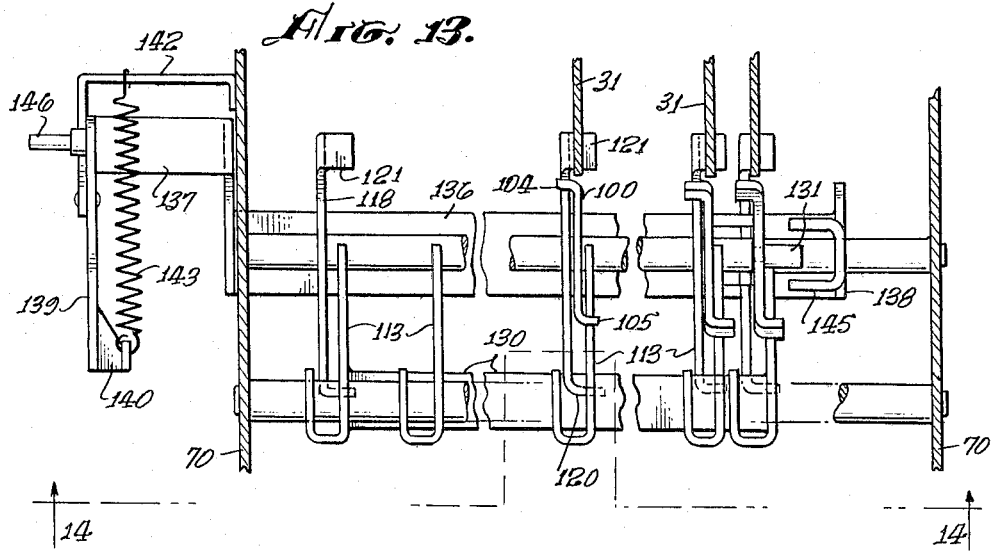
FIG. 13 is a fragmentary plan view of the credit transfer linkage.

At this point it may be noted that the actuation of the transfer pawl arm 113′ at the high side of the assembly will effect the release of the transfer latch 118′ at the low side of the assembly, so that in an ensuing power cycle, the rack unit at the low side will have the one digit over-travel which results from the release of a latch, thus adding (or subtracting) one digit to the units column. This transfer movement is derived from the actuation of the high side flipper which is identified at 100′ in FIGS. 13 and 14. This flipper differs from the others in that it has a stud 131 projecting from its rear side adjacent tail element 110 (FIG. 13). This stud actuates another portion of the credit transfer mechanism hereinafter described.

Figure 14:
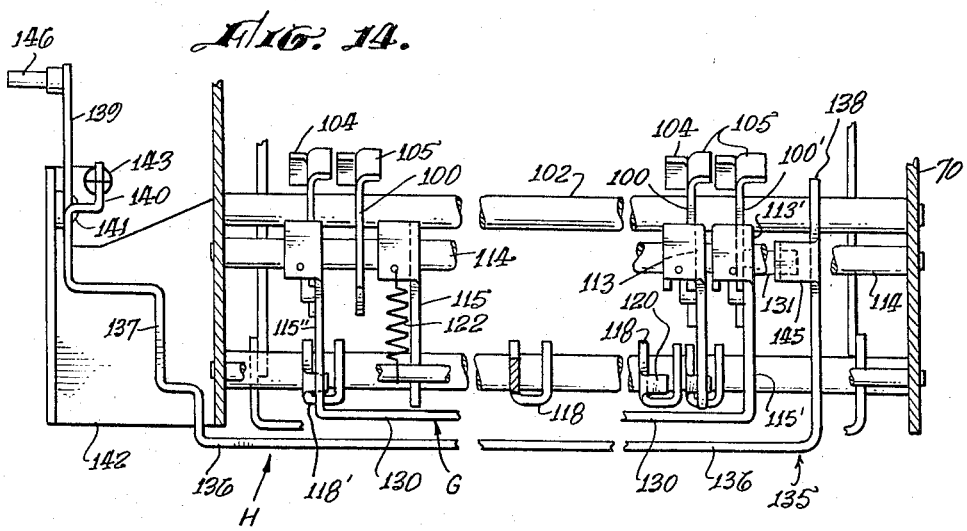
FIG. 14 is a transverse vertical sectional view taken as indicated by line 14—14 of FIG. 5 and FIG. 13.

*Credit Balance Rocker Assembly H.*—(FIGS. 6, 11–14) comprises a bail-frame 135 having a connecting bar 136 bridging beneath the accumulator assembly and integrally connecting an upwardly extending arm 137 at the front side of the mechanism to an upwardly extending arm 138 at the rear side of the mechanism. Arm 137 has a number of offsets and bends for clearing adjacent mechanism, and terminates in an upwardly projecting head 139 (FIG. 6) of generally L-shape having a horizontal arm provided with a spring anchor ear 140 and a vertical arm which is connected by an outboard pivot 141 to a bracket 142 mounted on forward frame member 70. Pivot 141 is located on the axis of the flipper shaft 102 and the upper end of rear arm 138 is rotatably mounted on this shaft (FIGS. 11 and 14).

A coil spring 143 is connected under tension between the anchor ear 140 and an anchor tab 144 on bracket 142. The longitudinal axis of spring 143 is arranged for over-center crossing of the line between fixed anchor point 144 and the common axis of pivot 141 and shaft 102, whereby the credit transfer bail frame 135, when moved over-center in either direction, will be spring-impelled to a limit position on that side of center (and will likewise be spring impelled to a limit position on the other side of center when moved past center in that direction).

Rear arm 138 is actuated by a lost motion connection with the high side flipper 100′, said connection comprising a pair of laterally spaced jaws 145 (FIGS. 11 and 13) embracing the projecting end of flipper stud 131. The lost motion is such that the flipper 100′ is operative in a tilting movement to engage one of the jaws 145 to move the bail frame 135 to its alternate position and to then return to its starting position without further interference from the other jaw 145.

Mounted in the upper end of the vertical arm of bail head 139 is a credit balance rocker stud 146. In general, the function of stud 146, as it swings to one limit position or another, is to actuate an indexing mechanism which intervenes in the operation of a power cycle to reverse the direction of operation of the accumulator mechanism upon the depression of a sub-total key. In doing this, the pin 146 swings in an inclined path, engaging the underside of a horizontal web portion 147 of a credit balance connecting link 148 (FIG. 15) raising the link 148 when moving in one direction and lowering it when moving in the other direction.

Connecting link 148 is connected by a pivot 149 to the upward end of a sub-total rear bell crank 150 (FIG. 2) forming part of the sub-total mechanism hereinafter described. The swinging end portion of connection link 148 (FIG. 15) comprises a pair of vertically spaced fingers 151 and 152 projecting horizontally toward the keyboard from a downwardly projecting arm 153 of link 148, the finger 152 having an upwardly projecting claw 154, which, when the link 148 is in its raised position, is operative to transfer movement from the sub-total bell crank 150 through the link 148 to the lower end of a credit balance trigger lever 155 which is connected by a pivot 156 to the rear side of the outer forward frame member 72. Finger 151 is a guide finger which projects through a vertical slot 157 (FIGS. 12 and 15) in an integral transversely extending wing 158 on the lower arm of trigger lever 155, holding the link 148 in alignment with the trigger 155 and determining a lower limit of movement of link 145 under the pull of a coil spring 159 which is connected under tension to the vertical arm 153 of link 148 and the bottom 84 of frame 72. In this lower limit position, the claw 154 clears the lower end of trigger 155 so that during normal sub-totaling operations, the trigger 155 remains unaffected.

The upper arm of trigger 155 has an integral offset web 160 projecting outwardly through an aperture 161 (FIG. 2) in a frame 72 and carrying an integral trigger arm 162 projecting toward the keyboard adjacent the forward side of frame 72. A coil spring 163 is connected under tension between the base of trigger arm 162 and an anchor stud 164 on frame 72, to normally bias the trigger in a position in which its lower end wing 158 is disposed forwardly toward the keyboard, its trigger arm 162 is raised, and its upper end, provided with a hook 165, is retracted rearwardly. Trigger arm 162, when moved downwardly, cooperates with the minus key linkage as hereinafter described. Hook 165, when shifted forwardly, cooperates with the credit symbol mechanism hereinafter described, to effect the printing of the symbol "C."

*The Add and Subtract Control Linkage I for the Accumulator Mechanism.*—comprises the rocker 81 (FIG. 12) which is mounted on a fixed pivot stud 170 on the forward side of forward frame member 72, the rocker 81 having a downwardly projecting arm provided with an outwardly projecting lower crank stud 171 and an upwardly projecting arm having at its upper end an outwardly projecting upper crank stud 172. Stud 171 is normally operative to transmit tilting movement to rocker 81 for shifting the gear-cam assemblies 65, 66 to the add side (engaging the teeth of rack bar 51) and stud 172 is normally operable, in response to depression of the minus key, to tilt rocker 81 counterclockwise, resulting in the rightward shift of gear-cam assemblies 65, 66 for subtract operation (engaging the gears with the teeth of rack bar 52).

Rocker 81 in each case receives its movement from the control cam 83 of unit D (FIG. 2) transmitted from either the stud 82 thereon or alternate stud 86. Movement of one of these studs, orbiting in a clockwise direction is transmitted to a vertical shoulder 173 constituting a substantially squared end of a pusher arm 174 (which is disposed immediately behind a generally similar pusher arm 175 having an abutment shoulder 176). Pusher arms 175, 174 are mounted on a common pivot 177 and thus connected to a slide bar 178 (FIG. 4) which is mounted on frame 72 for horizontal shifting movement. In a subtotaling operation, cam stud 86 engages the end 173 of pusher arm 174 (elevated into the path of stud 86 for that purpose) and shifts the slide bar 178 leftwardly. This leftward movement is transmitted to rocker stud 171 through the lower arm of a V-shaped two-way pawl 179 which is mounted on pivot 177 and thus pivotally connected to slide bar 178. In this sub-total operation, the upper arm of pawl 179 is in a lowered position clearing the pin 172 which can thus swing rightwardly past the forward end of this upper arm as the slide bar 178 shifts leftwardly.

In the subtracting operation, the double pawl 179 is elevated by the minus key linkage hereinafter described, to a position in which its upper arm will engage the rocker stud 172, whereby the leftward shift of slide bar 178 will tilt the rocker 81 in the counter-clockwise direction, the lower arm of double pawl 179 now being elevated to clear the rocker stud 171 so that the latter may swing freely beneath said lower arm. As previously noted, this counter-colckwise tilting of rocker 81 shifts the accumulator mechanism to the subtract side.

*Minus Key Linkage J.*—(FIG. 2) comprises a key 185 which is operative to depress the leftward end of a minus key lever 186 which is normally biased upwardly by a coil spring 187 anchored to a projection on a spring hanger plate 188, immediately below and parallel to the keyboard cover (not shown). The resulting counter-clockwise tilting of lever 186 about its pivot 189 is transmitted to an intermediate lever 190 (likewise mounted on the pivot stud 189). Fork 193 has a rightwardly extending bifurcated arm 194 embracing a stud 195 on the double pawl 179. It will now be apparent that counter-clockwise swinging of shift fork 193 in response to depression of minus key 185 will shift the double pawl 179 upwardly to bring its upper end into operative position for engaging rocker stud 172 and removing its lower arm to clearing relation to lower stud 171. Thus, upon the depression of the minus key, the leftward shifting of slide bar 178 will shift the accumulator mechanism to the minus position whereas, when the minus key 185 is not depressed, such leftward shifting of slide bar 178 will shift the accumulator mechanism to the add position.

Trigger arm 162 has a leftward end portion overhanging the leftward end of the minus key lever 186 (FIG. 2) and engageable immediately therewith upon counter-clockwise tilting of trigger 155. Thus, independently of the depression of minus key 185, the minus key lever will be actuated by the credit transfer linkage to shift the double pawl 179 into the subtract-actuating position.

*Symbol Rack Assembly L.*—(FIGS. 6, 17 and 18) comprises a rack plunger 31″ which is tied to a symbol dial actuator rack plunger 31′ by a transverse tie link 200 through a vertical slot 201 in the forward inner frame member 70. The upper end of rack plunger 31″ is slidably guided on a guide pin 202 extending through a vertical slot 211 (FIG. 6) in plunger 31″, and is provided with rack teeth 203 meshing with gear teeth 204 on one end of a symbol rack gear 205. Rack bars 31′ and 31″ are spring biased upwardly by a coil spring 206 which is connected under tension between tie link 200 and a suitable anchor on frame 70. Rack plunger 31′ has rack teeth engaging a gear 207 on symbol dial wheel 22, and in the spring powered upward movement of plunger 31′ it will position a symbol type (e.g. "C," seen in FIG. 17) for "credit" in accordance with the position at which upward movement of the plunger 31′ is arrested. The rest of such upward movement is provided for by symbol rack 31″ and its gear 205, which is axially elongated and has as its forward end, gear teeth 208 meshing with a segmental rack 209 which is actuated through suitable linkage connections (not shown) to the respective cycling control keys J and M (the add, subtract, sub-total and total keys) through the clutch actuating linkage (disclosed in my prior application S.N. 223,112) so as to stop the rotation of gear 205 in various positions for positioning the respective symbols for add, subtract, sub-total and total operations. The plungers 31′, 31″ are reset to a home position by the resetting action of reset bar 43 engaging a foot 41′ (FIGS. 6, 17) on the lower end of plunger 31′ in the same manner as the resetting of the accumulator plungers 31. For positioning the credit symbol in printing position, the symbol rack mechanism is interlinked with the credit transfer mechanism by means of a credit symbol locating stud 210 projecting rearwardly from symbol rack gear 208 in a position to be engaged by the hook 165 of trigger 155 when the latter has been shifted forwardly by a transfer operation (see FIG. 15).

*Sub-Total Mechanism M.*—(FIGS. 2 and 15) comprises a sub-total key 220 having a stem, the lower end of which is operative to depress a horizontal arm 221 of a sub-total bell crank which is pivoted at 222 to the forward side of forward outward frame member 72 and which is spring loaded for upward return movement by a coil spring 223 anchored to the keyboard subplate 188. The subtotal bell crank has a downwardly projecting arm provided with an outwardly projecting stud 224 operating in a longitudinal slot 225 in a push bar 226 the rear end of which is pivoted on the outer end of the stud 149 carried by the swinging upper end of rear sub-total bell crank 150. Pin 149 projects through an aperture 228 in outer frame member 72, its projecting inner end being connected to the rear end of credit balance connecting link 148 on the inner side of frame member 72, as previously described.

It will now be apparent that upon depression of subtotal key 220, the bell crank 150 will be rocked rearwardly, correspondingly moving the credit balance connecting link 148 rearwardly. If the forward end of link 148 has in the meantime been shifted upwardly, its claw 154 on its finger 152 will hook against the lower end of wing 158 of trigger 155, thereby indexing the minus key linkage into the subtract position by counter-clockwise tilting of trigger 155 transmitted to its lower end from claw 154 in response to the clockwise tilting of subtotal rear bell crank 150 upon depression of the subtotal key 220. Consequently, the subtotaling operation in this instance will produce a credit balance in positive figures, with the symbol "C" being imprinted to designate the same.

On the other hand, upon actuation of the subtotal key 220 in a normal subtotaling operation in which the credit balance connecting link 148 remains with its claw 154 in a normal lowered position, the forward movement of the link 148 in response to forward tilting of rear subtotal bell crank 150 will not affect the trigger 155 since the claw 154 will clear the lower end of trigger wing 158, moving underneath the same.

*Operation*

The operation of the apparatus can best be understood by first reviewing the consequences, in a conventional adding machine of the general type herein dealt with, of crossing the zero line in an adding or subtracting operation. For example, it will be assumed that the value 100 has been initially accumulated on the appropriate accumulator gears 66; and that successive numbers are then subtracted (by operation of the minus key) from the number 100 until the accumulated subtractions exceed the value 100, thus crossing the zero line. The attempt to subtract 102 from 100, for example, in a conventional machine would result in resetting all of the dial wheels 21 except the one in the unit column, so as to register the complement of the minus value (minus 2) representing the subtraction of 102 from 100. This complement value, in a nine column machine, would be the number 999,999,998 (or, in the conventional machine showing two decimal places, the number 9,999,999.98). This number has no meaning for the average person under these circumstances. The present invention provides for reversal of the accumulator gearing at the point of crossing the zero line, so as to register the positive number 2 "C" as a credit balance indicating the numerical value by which the accumulated subtractions have exceeded the number from which they were being subtracted.

It should be recognized that the attainment of such a credit balance has been hitherto accomplished in relatively large and complicated computing machines, but has not hitherto been available in a small lightweight machine of the type herein contemplated.

The operation of the apparatus, in the attainment of this result, will now be reviewed.

In a normal adding operation, a first number to be added is depressed on the keyboard, each key when punched effecting the projection of a pin of carriage C at a height corresponding to the digit value of the depressed key, and the carriage then being shifted toward the high side so as to shift the projected pin from the unit column to the tens column, then the hundreds, etc., as additional key depressions are made. Pins in succeeding vertical columns are projected for respective succeeding key depressions. When all digits of the number have been punched, there will be a number of projected pins corresponding to the number of key depressions. The add key is then depressed, initiating a power cycle in which a motor (not shown) rotates the cam D one revolution, the drive pin 82 of cam D transmitting a forward stroke to slide bar 178 by engagement with pusher arm 175 which normally is in position to be engaged by pin 82 but not by pin 86, which is shorter than pin 82 so as to clear the arm 175 but to engage pusher arm 174 for sub-totaling operation.

In the event that the slide bar 178 is in a forward position at the time the power stroke is commenced, it will be reset rearwardly to a starting position by engagement of pin 82 against a pawl 180 carried by an upwardly projecting extension 181 of the rear end of slide bar 178.

When the add key is depressed, the double pawl 179 will be in the lowered position shown in FIG. 4, and consequently the forward stroke of slide bar 178 transmitted through engagement of pin 82 against pusher arm 175 will cause the rocker 81 to be tilted in the clockwise direction by engagement of its pin 171 as seen in FIG. 4. This tilting movement of rocker 81 is transmitted to box cams 71 (FIG. 12) through bell cranks 75 and thence to gear shaft 65 through the camming action of slots 74 on the ends thereof. In the add operation, this results in all of the accumulator gears 66 being shifted forwardly into engagement with the teeth of rack 51 (FIG. 5) after the racks B have been elevated.

During an early stage of the power cycle, the holddown bar 43 is released for upward movement so as to in turn release the rack units B for upward shifting movements to various limit positions determined by engagement of their respective feet 41 against respective projected pins 42 of pin carriage C, the extent of upward shifting depending upon the positions of the respective pins 42 (in turn depending upon the digit value of the keys which were punched to project the pins 42). Again, the extent of upward shifting of the various rack units B determines the extents of revolutions which are imparted to the dial wheels A by the actuation of racks 36 against gears 37.

Each power cycle further effects the operation of a printing platen P to press the recording tape against the type of dial wheels A to imprint the number that was punched into the machine just preceding the power cycle. The dial wheels A will be set to their respective printing positions when the racks B reach the upper limits of their elevating movements. At this point it should be noted that during the elevation of the racks, B, the accumulator gears 66 will be in their neutral positions, disengaged from the teeth of both add and subtract rack arms 51 and 52, and will therefore remain stationary during the elevating movements. The shifting of the accumulator gears 66 into mesh with the teeth of rack 51 (for add operation) or into mesh with the teeth of rack arm 52 (for subtracting) will occur at the top of the rack-elevating stroke. It should also be understood that the pin carriage C is provided with a blocking means (not shown) which prevents the elevation of both rack bars in the higher decimal columns above the columns for which digits have been key-punched for the number that is posted into the machine for any given power cycle. Thus, only those racks in the decimal columns for which digits have been key-punched will be elevated, and their heights will correspond to the digits that were punched for the respective decimal columns. As these elevated racks descend, the gears that have been moved into mesh with them will be rotated a number of digit positions corresponding to the heights to which their respective racks were elevated. For the add operation, such rotation, executed by the downward stroke of a leftward rack arm 51, will always be counter-clockwise. Conversely, for a subtract operation, accumulator gear rotation will be clockwise as viewed in FIG. 5.

The shifting of an accumulator gear into a mesh with the respective add rack arm 51 places its cam 67 in position for its cam finger 106 to engage the associated flipper finger 104 and tilt the flipper as a full add rotation of the gear (accumulating a digit sum of 10) is completed and conversely, the shifting of the accumulator gear into mesh with the subtract rack arm 52 places its cam 68 in position for its finger 107 to engage the flipper finger 105 and tilt the flipper as a full subtract rotation of the gear is completed.

The operations just described are the same for a subtracting operation, with the exception that the accumulator gears 66 will be rotated in a minus direction instead of an add direction, due to having been shifted rightwardly into engagement with the rack bars 52 of units B. Such rightward shifting results from the setting of double pawl 179 (FIG. 4) to a raised position in which its upper arm will engage pin 172 of rocker 81 so as to rock the accumulator-setting linkage in the opposite direction from that previously described and thereby shift the accumulator gear shaft 65 and gear assembly rightwardly through the operation of box cams 71.

Each time the machine executes a power cycle in which the rack units B are elevated so as to transmit the value of the key-punched digits to the dials A, such values will be simultaneously transmitted by the lower racks of units B to the accumulator gears E on which the previously transmitted digit values have been stored (as the result of the accumulator gears being held in the positions to which they have previously been rotated). Each time any accumulator gear 66 completes a full rotation from its zero or starting position, a single step of rotation will be transmitted from this gear to the adjacent gear of next higher decimal place value, through the rocking of a corresponding flipper 100 when engaged by one of the cam projections 106, 107 of the associated cams 67, 68; said rocking movement being transmitted to the respective transfer pawl 113 of transfer mechanism F to release a respective latch lever 118 of the transfer mechanism, thereby lowering its respective stop 121 so as to permit downward over-travel of the plunger 31 in the next higher decimal place column so that the resetting of the rack units to their lowered positions will cause the gear 66 of said next higher decimal place column to be rotated an extra step, thereby registering the transfer of a single digit value from the one column to the adjacent column of the next higher decimal place position.

In any subtotaling operation, the values thus accumulated on the accumulator gears will be transferred to the dials A so as to be registered on the recording tape, such transfer being effected by the action of the radial shoulders of cam fingers 106, 107 against respective flippers 100 in arresting the rotation of the respective dial wheels 22, gears 66, and plungers 31 at positions corresponding to the values stored in the accumulator mechanism E. In this operation, the gears 66 are moved into mesh with their respective rack units B while the latter are at their home positions and prior to being elevated, whereby the length of the up stroke of each rack is determined by the amount of rotation required to bring a respective cam finger 106 or 107 from its accumulated value position into engagement with a respective flipper finger 104 or 105 (functioning in this instance as a stop). The extent of upward movement of the rack in turn determines the position to which the respective dial A is rotated and thus determines the digit that will be printed by the dial on the tape in the sub-totaling or totaling operation.

In the transfer operation which occurs at the end of a power stroke, in each decimal column where the accumulated value on an accumulator gear exceeds 9, the movement of this accumulator gear from its 9 to its 0 position is utilized to rock the flipper which releases the stop 121 of the next higher decimal column; but the movement of the accumulator gear of that next higher column in which one digit is added to its accumulated value is accomplished by the over-travel of the respective rack unit B of that next higher decimal column which takes place as the result of the release of the stop 121, and occurs after the accumulator gear of the preceding column has come to rest. Thus, the transfer operation involves only the rotation of the accumulator gear in the next higher decimal column and does not involve any further rotation of the accumulator gear in the preceding column. The actuation of the flipper of the preceding column which triggers the release of the stop 121 in the next higher column occurs during the transition from the 9 to 0 position of the accumulator gear in the preceding column.

In a subtracting operation wherein numbers are successively subtracted from a larger number previously accumulated in the machine, the dial wheels and accumulator gears at the low side of the machine, corresponding to the numbers being subtracted, will be rotated in the subtract direction, and as each dial wheel is reset back from 1 position to 0 position, its corresponding accumulator gear will tilt the flipper 100 of the next higher column to index the corresponding accumulator gear one digit in the subtract direction. As the dwindling accumulated remainder approaches the zero totaling limit of the machine, the accumulator gears will be reset through their respective zero positions consecutively from the low side to the high side, gradually reducing the accumulated total until, when such total approaches zero value, the high side accumulator gear will be moved back from its 1 position to its 0 position. During this movement, the accumulator gear 66 at the high side of the machine will be indexed in the subtract direction, until a respective cam finger 106 engages a respective stop finger 104 of the adjacent flipper 100' (the last flipper on the high side) and this flipper will then be rocked so as to transmit movement by camming action from a respective finger 111 to the transfer pawl 113' at the high side of the machine. This movement would represent the transition of the accumulated total one digit below the zero limit of the machine. Such movement is transmitted from the transfer pawl 113' at the high side to the transfer pawl 113 at the low side through the bridge bar 130, thus imparting a corresponding rocking movement to the low side pawl 113 with the result that the latch 118 at the low side of the machine is released, thus providing for downward overtravel of the corresponding rack unit B at the low side of the machine.

The rocking movement of the high side flipper 100' is transmitted from its stud 131 (FIG. 13) to a jaw 145 on the high-side arm 138 of the bail frame 135. This movement is transmitted through the bridge bar 136 of the bail frame 135 to the arm 137 thereof on the low side. The rocking of the low side arm 137 causes its stud 146, carried by its upper end, to rock in an arcuate movement against the underside of credit balance connecting link 148 (FIG. 15) in a manner to index this arm upwardly until its claw 154 is moved into obstructing relation to the lower end 158 of credit balance trigger lever 155.

During the ensuing power cycle, initiated by any sub-totaling operation, the connecting link 148 is shifted rearwardly (rightwardly as seen in FIG. 15), dragging the lower end of trigger arm 155 with it and causing the hook 165 at its upper end to swing into obstructing relation to the projecting pin 210 of the symbol gear 205, 208. Then as the symbol gear 205 is rotated by upward movement of rack 203 in the power cycle, such rotation will be arrested by engagement of pin 210 against hook 165, and at this point in the rotation of the symbol gear, the "C" (for "credit") of the symbol wheel 22 will be brought into printing position.

In any movement of the accumlator mechanism to the zero totaling limit of the machine in an accumulating operation initiated by depression of the subtract key, all of the printing wheels will have been brought to their non-printing positions. In any overtravel beyond the limit position during the same accumulator operation, reverse shift of the accumulator gear shaft will be effected by reverse tilting of the first flipper 100 at the low side when its finger 104 is engaged by cam finger 106 of the first accumulator cam 67, resulting in shift of shaft 65 and its gears 66 from the subtract side of the rack units B to the add side and as the overtravel continues to the extent dictated by the excess digit value that was punched on the keyboard beyond the totaling limit, this overtravel will be registered in the add direction because of the shifting of the accumulator gear assembly to the add position.

I claim:

1. In a ten-key adding and subtracting machine, in combination: a plurality of key-responsive actuator units disposed in respective decimal columns; means for resetting said actuator units to home positions in each cycle of operation in which key-punched numbers are registered by said actuator units; accumulator mechanism comprising a plurality of rotatable accumulator units on a common axis and means for shifting said accumulator units between positions of add and subtract operation by respective actuator units; a plurality of stop devices in the path of resetting movements of respective actuator units to determine their home positions, said accumulator mechanism registering accumulated values of successive cycles of operation, in the resetting to their home positions; sub-totaling mechanism for actuating said accumulator mechanism to register an accumulated sub-total; means actuated by said actuator units for printing on tape the number registered in each succeeding cycle of actuator operation; a plurality of transfer devices for transferring the accumulator action between consecutive accumulator units, said transfer devices being operable to effect release of respective stop devices for permitting single digit overtravel of respective actuator units beyond their home positions during resetting; credit transfer means comprising a bail including a bridge bar extending transversely of the machine from the high side to the low side of the machine and a pair of integral arms extending upwardly from the respective ends of said bridge bar and interconnecting the transfer device on the high side of the machine with the transfer device on the low side of the machine so as to release the corresponding low side stop device in response to transition of the accumulator mechanism across the zero point during a subtract accumulator operation cycle, thereby providing for overtravel of the first actuator unit on the low side such as to provide an interval for reversal of the accumulator mechanism from subtract to add position; whereby the accumulator mechanism will register a credit balance during the remainder of the operation cycle; a rotatable credit symbol printing wheel; rotatable means, including a toothed index wheel, for transmitting rotation to said printing wheel; a holding pawl engageable with said index wheel to determine a credit symbol printing position of said wheel; and means actuated by said high side transfer device in response to said transition of the accumulator mechanism across the zero point, for conditioning said holding pawl for engagement with said index wheel during a subsequent sub-totaling operation, whereby to effect imprinting of the credit symbol in association with said credit balance said last-named means comprising a rockable yoke extending transversely of the accumulator mechanism, having at the high side thereof a lost motion connection with said high side transfer device to receive rocking movement therefrom, and having at the low side a setting member operable to set the sub-totaling mechanism for actuating said holding pawl to holding position.

2. The machine defined in claim 1, including over-center spring means for holding said setting member in setting position until said yoke is positively returned to a normal position.

References Cited by the Examiner
UNITED STATES PATENTS

| | | | |
|---|---|---|---|
| 1,649,478 | 11/1927 | Landsiedel | 235—60 |
| 2,088,982 | 8/1937 | Sundstrand | 235—60 |
| 2,550,581 | 4/1951 | Mehan | 235—60.2 |
| 3,104,058 | 9/1963 | Logie | 235—137 |

RICHARD B. WILKINSON, *Primary Examiner.*

LOUIS J. CAPOZI, *Examiner.*

S. J. TOMSKY, *Assistant Examiner.*